United States Patent [19]

Evans et al.

[11] 4,432,721
[45] Feb. 21, 1984

[54] COMBUSTION AIR BUBBLE CHAMBER METHOD

[75] Inventors: Alyce D. Evans, Shiremanstown; John R. Hilty, Thomasville, both of Pa.

[73] Assignee: Testco, Inc., Camp Hill, Pa.

[21] Appl. No.: 335,278

[22] Filed: Dec. 29, 1981

[51] Int. Cl.³ .............................................. B01F 3/04
[52] U.S. Cl. ........................................ 431/4; 261/122; 261/123
[58] Field of Search ................... 261/122, 123; 368/93; 431/4

[56] References Cited

U.S. PATENT DOCUMENTS

| 47,679 | 5/1865 | Dunscomb | 261/122 |
|---|---|---|---|
| 1,600,951 | 9/1926 | Scott et al. | 261/123 |
| 1,923,978 | 8/1933 | Hill | 368/93 |
| 2,644,890 | 7/1953 | Hollihan | 368/93 |
| 3,043,433 | 7/1962 | Singer | 261/123 |
| 3,336,016 | 8/1967 | Schreiber | 261/123 |
| 3,348,330 | 10/1967 | Gilliam | 261/122 |
| 3,362,697 | 1/1968 | Silva et al. | 261/122 |
| 4,016,837 | 4/1977 | Wentworth, Jr. | 123/25 R |
| 4,152,374 | 5/1979 | Wenger et al. | 261/24 |
| 4,198,359 | 4/1980 | Todd | 261/123 |
| 4,295,816 | 10/1981 | Robinson | 431/4 |
| 4,363,639 | 12/1982 | Gladon | 261/122 |

FOREIGN PATENT DOCUMENTS

| 966026 | 9/1950 | France . | |
| 84748 | 8/1920 | Switzerland | 261/122 |

Primary Examiner—Tim R. Miles
Attorney, Agent, or Firm—Thomas Hooker

[57] ABSTRACT

A combustion air bubble chamber having an inner surface defining an hourglass-shaped column of water and bubble holes located at the bottom of the chamber outwardly of the waist so that bubbles rising from the holes contact the converging inner wall of the lower part of the chamber, are reduced in size, flow along such wall around the waist and outwardly along the diverging wall of the upper part of the chamber and are released from the upper wall to rise to the top of the water. These bubbles are effectively humidified as they rise from the bubble holes to the top of the water. Vapor drawn from the head space above the water is flowed to a burner combustion chamber for improving combustion efficiency.

8 Claims, 3 Drawing Figures

COMBUSTION AIR BUBBLE CHAMBER METHOD

The invention relates to an improved combustion air bubble chamber for humidifying air bubbles flowing up through water in the chamber. This humid air is drawn into the combustion chamber of the burner in order to improve combustion efficiency.

The air bubbled through the chamber is flowed upwardly against the converging surface of the side wall so that the bubble size is reduced and a bond is formed between the bubbles and the side walls. The bubbles rise up against the side wall, migrate around a waist and then migrate upwardly and outwardly along a diverging part of the side wall and are released as they flow along this part of the side wall to form a relatively uniform upward flow of small bubbles which rise and break quietly through the surface of the water. The relatively long total rise time and small bubble size effectively evaporates water vapor into the bubbles to efficiently humidify the bubble air.

In the disclosed bubble chamber, the side wall has an hourglass shape with a series of bubble holes located beneath the outer edge of the lower frustum of the surface so that streams of bubbles migrate up along the inner frustum, past the circular waist of the side wall and then out along the divergent upper frustum, forming an upward flow of small bubbles rising to the surface and breaking through an annular area at the circumference of the surface of the water. Bubbles also rise up directly through the water column.

Conventional bubble chambers are shown in U.S. Pat. Nos. 4,152,374 and 4,016,837. In these bubble chambers, the air to be humidified is bubbled up directly and rapidly through the chamber and breaks through the surface to form large, splattering bubbles which throw up water particles likely to be entrained within the air drawn from the bubble chamber. The particles may undesirably cool the flame in the burner.

Other objects and features of the invention will become apparent as the description proceeds, especially when taken in conjunction with the accompanying drawings illustrating the invention, of which there are two sheets and one embodiment.

IN THE DRAWINGS

FIG. 3 is a sectional view taken along line 3—3 of FIG. 2.

DESCRIPTION OF THE INVENTION

Figure 1:
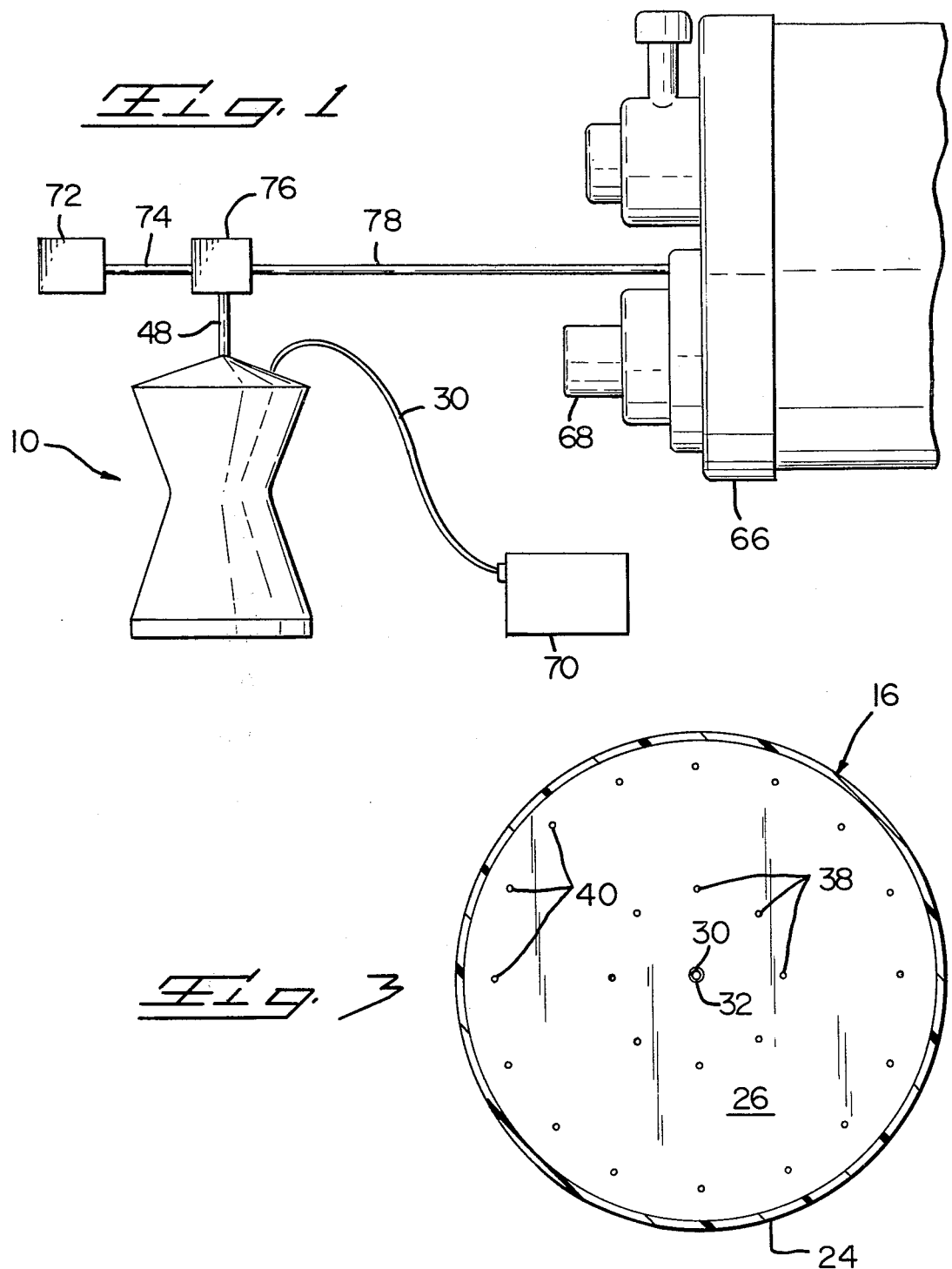
FIG. 1 illustrates generally the installation of the combustion air bubble chamber in a burner system.
Figure 2:
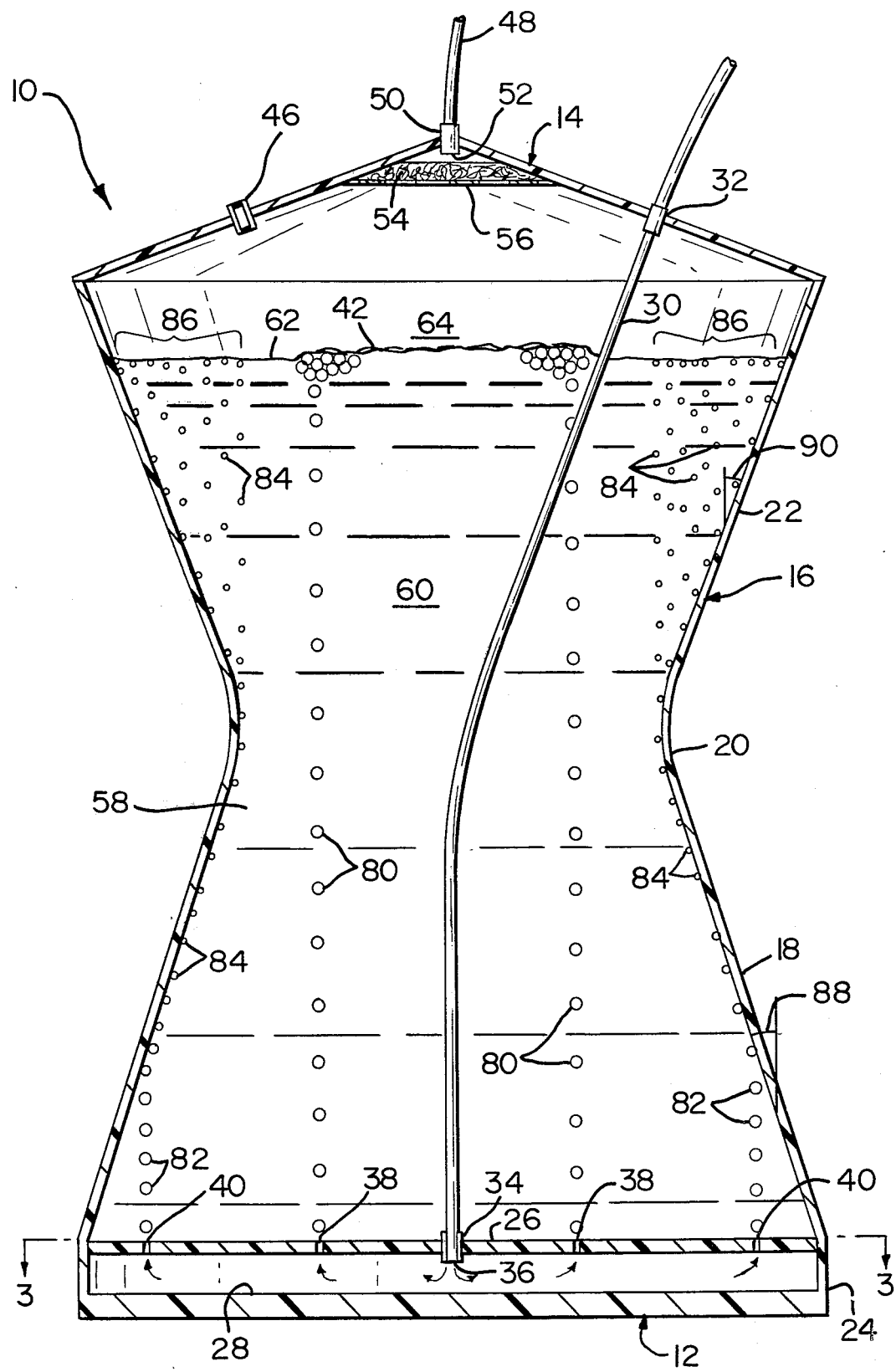
FIG. 2 is a vertical sectional view through the bubble chamber.

Combustion air bubble chamber 10 includes a flat bottom wall 12, a shallow conical top wall 14 and an hourglass-shaped side wall 16 joining the top and bottom walls. The side wall includes a lower conical frustum 18 which slopes inwardly to a smooth waist 20 and an upper conical frustum 22 sloping outwardly from waist 20. The lower end of frustum 18 is connected to the outer circumference of bottom wall 12 by cylindrical portion 24 of side wall 16. The waist 20 forms a smooth transition between the upper end of frustum 22 and the lower end of frustum 18. The upper end of the frustum 22 is joined to the outer circumference of top wall 14. When the bubble chamber is in operation, wall 12 rests on a horizontal surface so that the axis of the chamber is vertical.

A manifold plate 26 extends across the interior of the chamber 10 a short distance above the bottom wall 12 and joins the side wall 16 at the top of portion 24 to define an air manifold 28 at the bottom of the chamber. Air supply tube 30 extends from outside the chamber 10 through a vapor tight passage 32 formed in top wall 14, down through the interior of the bubble chamber and through a vapor tight passage 34 formed in the center of wall 26 so that the end 26 of the tube opens into manifold 28.

Two sets of bubble holes are formed through wall 26 communicating the manifold with the interior of the bubble chamber. A first set of bubble holes 38 lie on a circle centered on the vertical axis of the chamber and having a radius sufficiently less than the minimum interior radius of waist 20 so that bubbles formed from air flowing through holes 38 rise directly to the top of the water in the chamber without contacting the side walls of the chamber or interfering with bubbles rising along the interior surface of side wall 16. The eight holes 38 are equally circumferentially spaced around the center of the wall 26 to reduce the possibility of bubbles rising from adjacent holes contacting each other and coalescing.

Wall 26 is provided with a second set of equally spaced bubble holes 40 arranged in a circle around the center of the wall inwardly a short distance from the outer edge of the wall. Bubbles rising up through the holes 40 contact the inwardly sloping downwardly facing surface of frustum 18. There are twice as many bubble holes 40 as bubble holes 38 so that two-thirds of the air flowed into the chamber through tube 30 bubbles up along the side wall 16. Holes 38 and 40 may be 1/16 inch in diameter.

The bubble chamber top wall 14 includes a normally sealed filling plug 46. Plug 46 may be opened to facilitate routine cleaning of the bubble chamber. A vapor discharge tube 48 extends through a vapor tight passage 50 formed at the apex of top wall 14 to a free end 52 within the chamber slightly below the top wall. A splash filter 54 is confined against the top wall by perforated plate 56 to assure that gas drawn from the interior of the chamber through tube 48 is free of water particles.

The hourglass-shaped interior volume 58 of chamber 10 is filled with distilled water 60 having a surface 62 at a level below the junction between the side wall 16 and top wall 14 and above the minimum diameter waist of 20, leaving a small volume head space 64 at the top of the chamber. Manifold 28 fills with water when the chamber is filled.

FIG. 1 illustrates the installation of combustion air bubble chamber 10 for supplying humidified air to the combustion chamber of a furnace 66 having a burner 68 which may be gas or oil fired. The outer free end of tube 30 is connected to a source of dry compressed air 70 which flows air through the tube to the air manifold 28 under normal pressure of from one to two pounds per square inch, depending upon the height of the water column in the chamber. Combustion air is flowed to the combustion chamber of furnace 66 from combustion air source 72, through line 74, venturi 76 and line 78 extending into the combustion chamber. The outer free end of vapor tube 48 is attached to the low pressure port of venturi 76 so that the flow of combustion air through the venturi draws humidified vapor from head space 64 through filter 54 and into the combustion chamber thereby improving combustion efficiency.

During operation of bubble chamber 10, air from source 70 flows through tube 30, into and through manifold 28 and bubbles up through bubble holes 38 and 40 into the distilled water 60 in the volume 58. The bubbles 80 flowing up through openings 38 rise unimpeded through the water column to surface 62, picking up humidity as they rise and burst through surface 62, releasing humidified air into the head space 64. Bubbles 80 rise rapidly through the water without coalescence and burst through the surface 62 in a circular ring 42 above the circle of holes 38. The bubbles agitate the water at surface 62 similar to the agitation of the surface of water brought to a rolling boil. The vertical separation between surface 62 and filter 54 is preferably sufficient so that water thrown upwardly when the bubbles 50 break the surface does not splatter up to the filter. When air is supplied to manifold 28 at about one and one-half pounds per square inch and bubble holes 38 are 1/16 inch in diameter, a 4-inch clearance is required between the surface 62 and the filter to prevent water droplets from being thrown up on to the filter. This is for a chamber having a bubble rise distance of about 20 inches.

Wall 26 has twice as many bubble holes 40 as bubble holes 38 so that two-thirds of the air flowing into the manifold 28 bubbles up through holes 40. These bubbles 82 rise vertically a short distance through the water and contact the converging downwardly facing inner conical surface of the lower frustum 18 and then migrate up along this surface to minimum diameter of waist 20. The engagement between the bubbles and the surface of frustum 18 tends to break down individual bubbles into a greater number of smaller bubbles, thereby increasing the surface area to volume ratio for each unit of air flowed upwardly along the surface. This increase in the bubble surface to air volume ratio increases humidification of the air as it rises through the water 60. The upward buoyancy of the bubbles holds them against the inner surface of frustum 18 as they migrate toward the waist 20, forming a bond between the bubbles and the inner surface of the side wall. This bond continues to hold bubbles against the side wall as the bubbles migrate upwardly past the waist and along the inner divergent wall of the upper frustum 22. The inner divergent wall forms an upwardly facing bubble migration surface.

Bubbles 84 are released as they move along the divergent inner migration wall of frustum 16 with some bubbles being released immediately adjacent the waist and other bubbles migrating upwardly along the wall nearly to the surface 62. In this way, a relatively uniform density of small bubbles 84 is released along the divergent inner wall of frustum 22, float or rise vertically upwardly to surface 62 and break through the surface 62 into head space 64 without coalescing. The small bubbles 84 break quietly through surface 62 without spattering. These bubbles rise through surface 62 in an annular area surrounding the outer circumference of surface 62 and having a radial extent indicated by brackets 86 equal to the difference between the radius of surface 62 and the minimum radius of waist 20.

The frictional engagement between the small bubbles 84 and the inner surface of side wall 16 slows the ascent of bubbles 84 along the side wall and is believed to be the mechanism which breaks large bubbles into smaller bubbles. The smaller size bubbles 84 also rise freely through water slower than the larger bubles 80. The frictional engagement and small size of the bubbles provides a longer total rise time for the air flowing through holes 40 than the air which directly rises to the surface from holes 38. In this way, the air rising through holes 40 has a relatively longer time for acquiring water vapor through evaporation. Evaporation is further enhanced by the smaller size of the bubbles as a result of a greater surface area-to-volume ratio. The air breaking into the head space 64 from bubbles 84 is very nearly if not completely saturated with water vapor, with the result that the air in head space 64 contains appreciably greater water vapor or humidity than air bubbled through conventional bubble chambers of the type described previously.

The humid air collected in the head space is drawn into line 48 by the venturi 76 and flowed into the combustion chamber of burner 66 to increase the efficiency of the burner in a well-known manner. The increased efficiency of bubble chamber 10 over that of conventional chambers means that a single smaller unit may be used in place of one or more conventional units. The size and capacity of air source 70 may be reduced.

An additional advantage of bubble chamber 10 over conventional chambers where the bubbles rise vertically through the water column is that in chamber 10 the rising bubbles do not recirculate the water between the top and bottom of the chamber. Bubble chambers of this type are filled with water, sealed and left to operate for long periods of time between maintenance. During the long-term continuous usage, the air flowed into the chamber carries impurities with it which tend to collect on the upper water surface 62. In conventional chambers the water is recirculated between the top and bottom of the chamber and impurities are drawn down with the circulating water and may clog bubble holes at the bottom of the chamber, thereby decreasing the efficiency of the chamber. In the present chamber, where there is no recirculation, the impurities remain at surface 62.

The chamber 10 operates with bottom wall 12 resting on a horizontal surface. A vertical axis extending from the center of the circular bottom wall extends to the peak of top wall 14. The side wall 16 is preferably a surface of revolution about the vertical axis so that all bubbles 82 migrate along the same shaped surface as they move up toward the head space 64. The inner surface of lower frustum 18 slopes inwardly from the vertical at an angle 88 of about 17 degrees. The angle 90 of outward slope of the inner surface of upper frustum 22 from the vertical may be about 21 degrees. The slopes of the upper and lower frustums assure that bubbles 84 migrate along the lower frustum, around the waist 20 and are randomly released as they migrate along the divergent wall of the upper frustum to form the desired relatively uniform upward bubble flow radially outwardly of waist 20.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim our invention is:

1. A method of supplying humidified air to a combustion device, comprising bubbling air into water within a bubble chamber, flowing the bubbles upwardly against a downwardly facing inclined surface, attaching the bubbles to such surface, transferring the bubbles from the top of such surface around a smooth, gradual transition surface to the bottom of an upwardly facing surface sloping across the chamber, attaching the bubbles to such upwardly facing surface, moving the bubbles upwardly along such surface, releasing the bubbles along such surface at different locations to form a relatively uniform flow of bubbles floating up to the water surface, humidifying the air in the bubbles as they move upwardly in the water, collecting the vapor above the surface of the water, and conducting the collected vapor to the combustion device.

2. The method of claim 1 including the step of breaking the bubbles through the surface of the water without splashing.

3. The method of claim 1 including the step of moving the bubbles along the upward facing surface at an angle of about 21 degrees to the vertical.

4. The method of claim 1 including the step of breaking individual bubbles into smaller bubbles as they flow along one of the surfaces.

5. The method of claim 1 including the step of migrating bubbles upwardly along an inwardly converging lower frustum, around a waist at the top of the lower frustum and then outwardly along the upwardly facing wall of an outwardly diverging frustum.

6. The method of claim 5 wherein the bubbles migrate along the lower frustum at an angle of about 17 degrees to the vertical and the bubbles migrate along the surface of the upper frustum at an angle of about 21 degrees to the vertical.

7. The method of claim 6 including the step of bubbling air upwardly through the water inwardly of the waist without contacting the bubbles flowing along the waist.

8. The method of claim 6 including the step of breaking individual bubbles into a plurality of smaller bubbles.

* * * * *